US007877233B2

(12) United States Patent
Middleton, Jr. et al.

(10) Patent No.: US 7,877,233 B2
(45) Date of Patent: Jan. 25, 2011

(54) SELECTIVELY PRESENTING TIMESTAMPED TIME-SERIES DATA VALUES FOR RETRIEVED SUPERVISORY CONTROL AND MANUFACTURING/PRODUCTION PARAMETERS

(75) Inventors: Elliott S. Middleton, Jr., Tyler, TX (US); Shripathi Kamath, Mission Viejo, CA (US)

(73) Assignee: Invensys Systems, Inc., Foxboro, MA (US)

( * ) Notice: Subject to any disclaimer, the term of this patent is extended or adjusted under 35 U.S.C. 154(b) by 569 days.

(21) Appl. No.: 11/460,176

(22) Filed: Jul. 26, 2006

(65) Prior Publication Data

US 2008/0027683 A1 Jan. 31, 2008

(51) Int. Cl.
*G06F 17/40* (2006.01)
(52) U.S. Cl. .......................... 702/187; 702/67; 345/440
(58) Field of Classification Search ............. 702/66–68, 702/70, 73, 79, 80, 187, 189, 190; 345/440, 345/440.1; 324/76.12, 76.15, 121 R; 708/300
See application file for complete search history.

(56) References Cited

U.S. PATENT DOCUMENTS

| | | | | |
|---|---|---|---|---|
| 4,713,771 A | * | 12/1987 | Crop | 702/67 |
| 4,827,259 A | * | 5/1989 | Murphy et al. | 341/123 |
| 6,473,700 B1 | * | 10/2002 | Holaday et al. | 702/66 |
| 6,515,665 B1 | * | 2/2003 | Ross | 345/440 |
| 6,731,286 B2 | * | 5/2004 | Ritter | 345/440 |
| 6,937,678 B2 | * | 8/2005 | Abel | 375/350 |
| 2007/0027888 A1 | * | 2/2007 | Avergun et al. | 707/101 |

* cited by examiner

*Primary Examiner*—Manuel L Barbee
(74) *Attorney, Agent, or Firm*—Leydig, Voit & Mayer Ltd

(57) ABSTRACT

A process control and manufacturing information database client application is disclosed for rendering and displaying a filtered set of received time-series data. A client application, such as a trending client that graphically displays a series of data point values for a particular observed parameter of a manufacturing process receives, via a data acquisition interface, a set of timestamped time-series data values for an observed parameter from a process control and manufacturing information database. Thereafter, the client application invokes a time-series data filter that includes/supports at least one filtering operation that is applied to the set of timestamped time-series data values to render a filtered data set for plotting/drawing on the graphical display interface. The filtered data set is thereafter rendered by a display function as a series of plotted points on a time-line graph.

29 Claims, 7 Drawing Sheets

SELECTIVELY PRESENTING TIMESTAMPED TIME-SERIES DATA VALUES FOR RETRIEVED SUPERVISORY CONTROL AND MANUFACTURING/PRODUCTION PARAMETERS

CROSS-REFERENCE TO RELATED APPLICATIONS

The present application generally relates to Jensen et al. U.S. application Ser. No. 11/190,179 filed on Jul. 26, 2005, entitled "SYSTEM AND METHOD FOR RETRIEVING INFORMATION FROM A SUPERVISORY CONTROL MANUFACTURING/PRODUCTION DATABASE," and Avergun et al. U.S. application Ser. No. 11/189,353 filed on Jul. 26, 2005, entitled "SYSTEM AND METHOD FOR APPLYING DEADBAND FILTERING TO TIME SERIES DATA STREAMS TO BE STORED WITHIN AN INDUSTRIAL PROCESS MANUFACTURING/PRODUCTION DATABASE." The contents of each of the above identified applications are expressly incorporated herein by reference in their entirety including the contents and teachings of any references contained therein.

TECHNICAL FIELD

The present invention generally relates to computing and networked data storage systems, and, more particularly, to techniques for managing (e.g., storing, retrieving, processing, etc.) streams of supervisory control, manufacturing, and production information. Such information is typically rendered and stored in the context of supervising automated processes and/or equipment. The data is thereafter accessed by a variety of database clients such as, for example, by trending applications.

BACKGROUND

Industry increasingly depends upon highly automated data acquisition and control systems to ensure that industrial processes are run efficiently and reliably while lowering their overall production costs. Data acquisition begins when a number of sensors measure aspects of an industrial process and report their measurements back to a data collection and control system. Such measurements come in a wide variety of forms. By way of example the measurements produced by a sensor/recorder include: a temperature, a pressure, a pH, a mass/volume flow of material, a counter of items passing through a particular machine/process, a tallied inventory of packages waiting in a shipping line, cycle completions, etc. Often sophisticated process management and control software examines the incoming data associated with an industrial process, produces status reports and operation summaries, and, in many cases, responds to events/operator instructions by sending commands to actuators/controllers that modify operation of at least a portion of the industrial process. The data produced by the sensors also allow an operator to perform a number of supervisory tasks including: tailor the process (e.g. specify new set points) in response to varying external conditions (including costs of raw materials), detect an inefficient/non-optimal operating condition and/or impending equipment failure, and take remedial action such as move equipment into and out of service as required.

A very simple and familiar example of a data acquisition and control system is a thermostat-controlled home heating/air conditioning system. A thermometer measures a current temperature, the measurement is compared with a desired temperature range, and, if necessary, commands are sent to a furnace or cooling unit to achieve a desired temperature. Furthermore, a user can program/manually set the controller to have particular setpoint temperatures at certain time intervals of the day.

Typical industrial processes are substantially more complex than the above-described simple thermostat example. In fact, it is not unheard of to have thousands or even tens of thousands of sensors and control elements (e.g., valve actuators) monitoring/controlling all aspects of a multi-stage process within an industrial plant or monitoring units of output produced by a manufacturing operation. The amount of data sent for each measurement and the frequency of the measurements varies from sensor to sensor in a system. For accuracy and to facilitate quick notice/response of plant events/upset conditions, some of these sensors update/transmit their measurements several times every second. When multiplied by thousands of sensors/control elements, the volume of data generated by a plant's supervisory process control and plant information system can be very large.

Specialized process control and manufacturing/production information data storage facilities (also referred to as plant historians) have been developed to handle the potentially massive amounts time-series of process/production information generated by the aforementioned systems. An example of such system is the WONDERWARE IndustrialSQL Server historian. A data acquisition service associated with the historian collects time-series data values for observed parameters from a variety of data sources (e.g., data access servers). The collected time-series data is thereafter deposited with the historian to achieve data access efficiency and querying benefits/capabilities of the historian's relational database. Through its relational database, the historian integrates plant data with event, summary, production and configuration information.

Traditionally, plant databases, referred to as historians, have collected and stored in an organized manner (i.e., "tabled"), to facilitate efficient retrieval by a database server, streams of timestamped time-series data values for observed parameters representing process/plant/production status over the course of time. The status data is of value for purposes of maintaining a record of plant performance and presenting/recreating the state of a process or plant equipment at a particular point in time. Over the course of time, even in relatively simple systems, Terabytes of the steaming time stamped information are generated by the system and tabled by the historian.

Information is retrieved from the tables of historians and displayed by a variety of historian database client applications including trending and analysis applications at a supervisory level of an industrial process control system/enterprise. Such applications include graphical displays for presenting/recreating the state of an industrial process or plant equipment at any particular point (or series of points) in time. A specific example of such client application is the WONDERWARE ActiveFactory trending and analysis application. This trending and analysis application provides a flexible set of graphical display and analytical tools for accessing, visualizing and analyzing plant performance/status information provided in the form of streams of time-series data values for observed parameters.

In presenting time-series data from industrial operations and/or controlled systems, the amount of raw data generated for observed parameters can number in the millions of stored values. Displaying/plotting the values on trending graphical displays consumes considerable computer resources.

SUMMARY OF THE INVENTION

In accordance with the present invention, a client application invokes a filtering operation upon received time-series data point sets. The client application thereafter plots/draws the filtered data point sets on a graphical display.

In the exemplary embodiments disclosed herein, a process control and manufacturing information database client application, such as a trending client that graphically displays a series of data point values for a particular observed parameter of a manufacturing process, initially receives, via a data acquisition interface, a set of timestamped time-series data values for an observed parameter from a process control and manufacturing information database.

Thereafter, the client application invokes a time-series data filter. The time-series data filter includes/supports at least one filtering operation that is applied to the set of timestamped time-series data values to render a filtered data set for plotting/drawing on the graphical display interface. Furthermore, the exemplary embodiment incorporates an extensible, component-based, architecture that enables supplementation of the set of filter types supported by the client application. Embodiments also support tuning various characteristics of the filters (e.g. time periods, deadband value ranges, etc.).

The filtered data set is thereafter rendered by a display function as a series of plotted points on a time-line graph. Thus, the client application is able to reduce, in a meaningful manner, the quantity of data points plotted on a graphical display representing a set of time-series data point values.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

A control system/plant historian service supports retrieval operations wherein previously tabled data is provided on demand and in response to client requests. The term "tabled" is used herein to describe data received by the database/historian server and stored in an organized manner to facilitate later retrieval by the database/historian server in response to client requests. The terms "client requests" and "on demand" are intended to be broadly defined. A "client request", unless specifically noted, includes requests initiated by human machine interface users and requests initiated by automated client processes.

Client applications that request and display trending timestamped data provided, for example, by the aforementioned historian server over a designated time span have not adequately addressed presenting time-series data in instances where the sample rate of the time-series data far exceeds the rate at which the data is best displayed via a trending application's graphical interface. As will be shown by way of illustrative examples provided herein, a historian client application embodying the present invention applies a filter to data retrieved from a database/historian server before plotting the data points on a graphical display. In accordance with illustrative embodiments, an exemplary trending application performs "best fit", "swinging door", and "value/time" filtering on retrieved time-series data streams for parameters of interest. Each of the three exemplary filtering techniques is described herein below.

Figure 1:
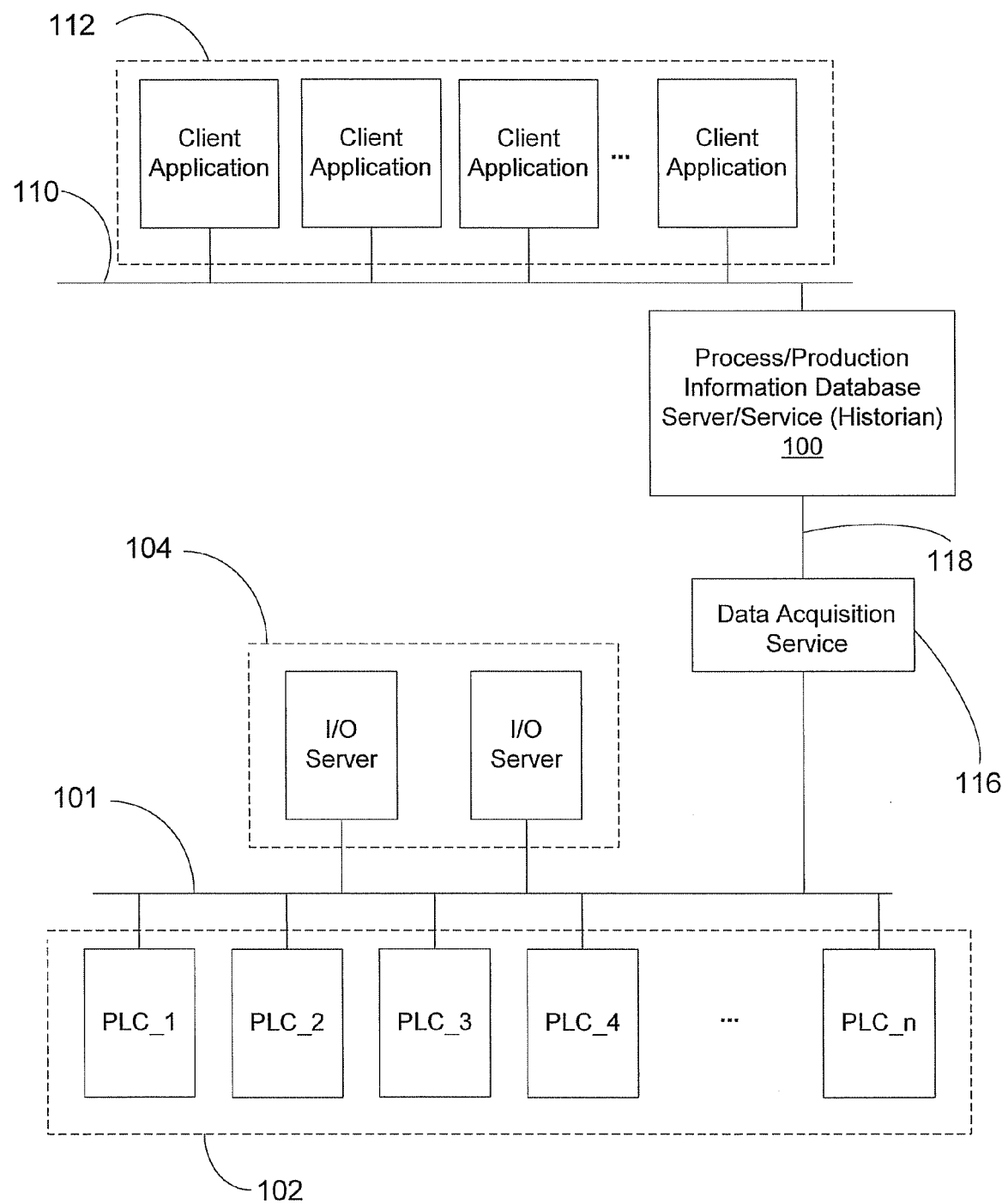
FIG. 1 is a schematic diagram of an exemplary networked environment wherein a process control database client application (e.g., a trending display program) component embodying the present invention is advantageously incorporated.

The following description is based on illustrative embodiments of the invention and should not be taken as limiting the invention with regard to alternative embodiments that are not explicitly described herein. Those skilled in the art will readily appreciate that the illustrative example in FIG. 1 represents a simplified configuration used for illustrative purposes. In particular, the systems within which the present invention is incorporated are substantially larger and the breadth of network connections to client applications greater (including clients that access the historian via an Internet portal server). While the illustrative network arrangement depicts a local area network connection between a historian node and client application nodes, other client applications are potentially connected via wide-area network links to the historian. In many instances, the number of data sources is several times larger—resulting in massive quantities of time-series process data associated with potentially hundreds and even thousands of data points in a process control system.

FIG. 1 schematically depicts an illustrative environment wherein a supervisory process control and manufacturing/production information data storage facility (also referred to as a plant historian or historian) 100 and historian client applications embodying the present invention are potentially incorporated. The network environment includes a plant floor network 101 to which a set of process control and manufacturing information data sources 102 are connected either directly or indirectly (via any of a variety of networked devices including concentrators, gateways, integrators, interfaces, etc.).

While FIG. 1 illustratively depicts the data sources 102 as a set of programmable logic controllers (PLCs) 1-N, the data sources 102 comprise any of a wide variety of data sources (and combinations thereof) including, for example, programmable logic controllers (PLCs), input/output modules, and distributed control systems (DCSs). The data sources 102, in turn, are coupled to, communicate with, and control a variety of devices such as plant floor equipment, sensors, and actuators. Data received from the data sources 102 potentially represents, for example, discrete data such as states, counters, events, etc. and analog process data such as temperatures, tank levels/pressures, volume flow, etc. A set of I/O servers 104, for example data access servers developed and provided by WONDERWARE, acquire data from the data sources 102 via the plant floor network 101 on behalf of a variety of potential clients/subscribers—including the historian 100.

The exemplary network environment includes a production network 110. In the illustrative embodiment the production network 110 comprises a set of client application nodes 112 that execute, by way of example, trending applications that receive and graphically display time-series values for a set of data points. One example of a trending application is Wonderware's ACTIVE FACTORY application software. The data driving the trending applications on the nodes 112 is acquired, by way of example, from the plant historian 100 that also resides on the production network 110. Alternatively, the client applications reside on non-local nodes communicatively connected to the historian 100 via a wide area network link. The historian 100 includes database services for maintaining and providing a variety of plant/process/production information including historical plant status, configuration, event, and summary information.

A data acquisition service 116, for example WONDERWARE'S remote IDAS, interposed between the I/O servers 104 and the plant historian 100 operates to maintain a continuous, up-to-date, flow of streaming plant data between the data sources 102 and the historian 100 for plant/production supervisors (both human and automated). The data acquisition service 116 acquires and integrates data (potentially in a variety of forms associated with various protocols) from a variety of sources into a plant information database, including timestamped data entries, incorporated within the historian 100.

The physical connection between the data acquisition service 116 and the I/O servers 104 can take any of a number of forms. For example, the data acquisition service 116 and the I/O servers can comprise distinct nodes on a same network (e.g., the plant floor network 110). However, in alternative embodiments the I/O servers 104 communicate with the data acquisition service 116 via a network link that is separate and distinct from the plant floor network 101. In an illustrative example, the physical network links between the I/O servers 104 and the data acquisition service 116 comprise local area network links (e.g., Ethernet, etc.) that are generally fast, reliable and stable.

The connection between the data acquisition service 116 and the historian 100 can also take any of a variety of forms. In an embodiment of the present invention, the physical connection comprises an intermittent/slow connection 118 that is potentially: too slow to handle a burst of data, unavailable, or faulty. The data acquisition service 116 and/or the historian therefore include components and logic for handling streams of time-series data values for observed parameters from components connected to the plant floor network 101. The time-series data received by the historian 100 are preferably assigned timestamps at the point of acquisition rather than at the time of reception by the historian 100 to ensure the values are properly sequenced. Furthermore, the points of acquisition preferably utilize synchronized clocks (e.g., GPS clock signal) to ensure that all sources of data accurately assign timestamps to their data prior to submission to the historian 100 (via the data acquisition service 116).

Figure 2:
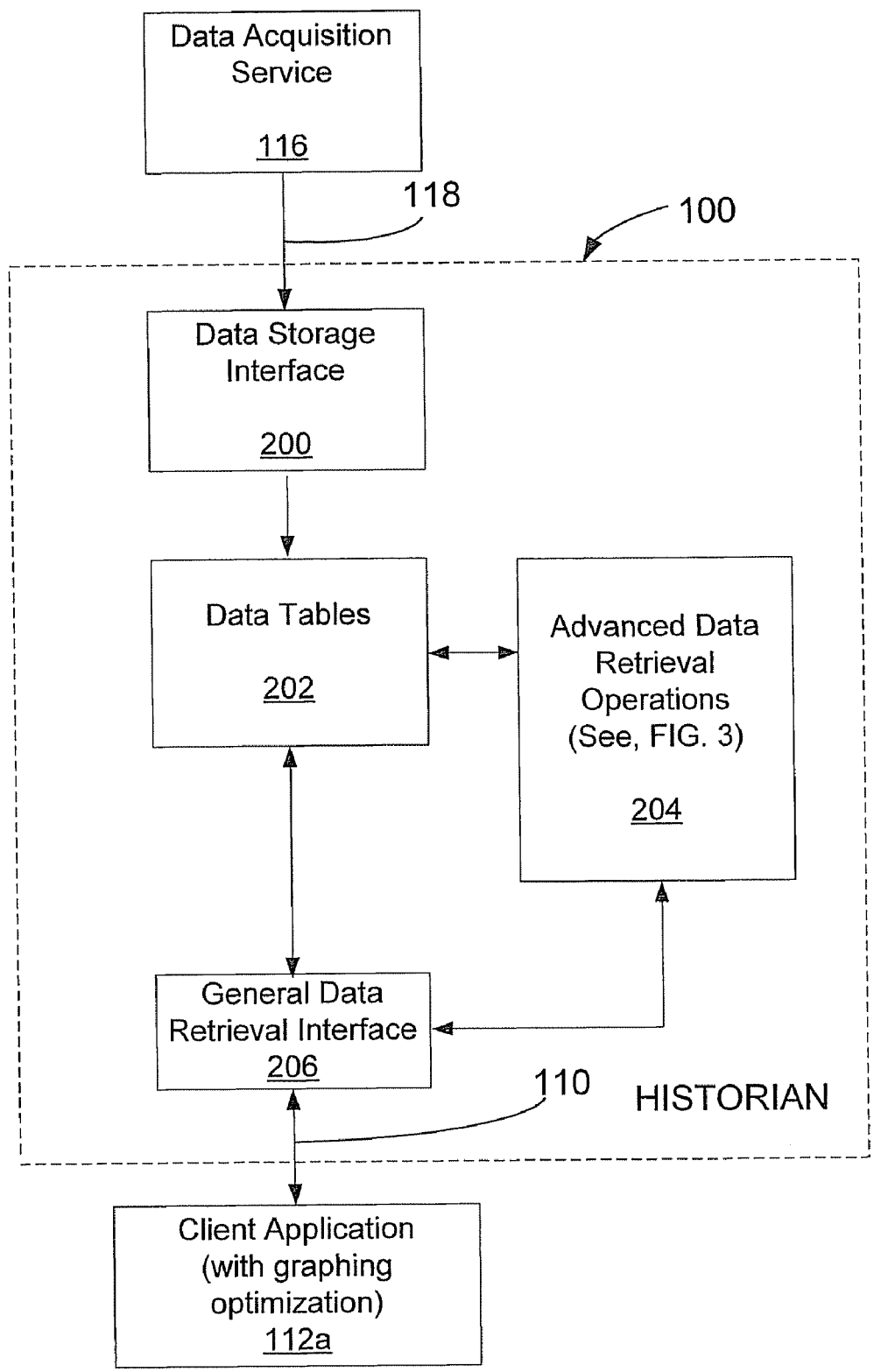
FIG. 2 is a schematic drawing of functional/structural aspects of a historian server/service and trending application embodying the present invention.

Turning to FIG. 2 an exemplary schematic diagram depicts functional components associated with the historian 100 and a client application, having an associated data acquisition interface for obtaining time-series data values for observed parameters from the historian 100, on node 112a. In accordance with an exemplary embodiment, the client application incorporates graphing optimization functionality (described herein below) to reduce the number of actual plotted data points on the client application's graphical display. The historian 100 generally implements a storage interface 200 comprising a set of functions/operations for receiving and tabling data from the data acquisition service 116 via connection 118. The received data is stored in one or more tables 202 maintained by the historian 100.

By way of example, the tables 202 include time-series pieces of data values for observed parameters received by the historian 100 via a data acquisition interface to a process control/production information network such as the data acquisition service 116 on network 101. In the illustrative embodiment each piece of data is stored in the form of a value, quality, and timestamp. These three parts to each piece of data stored in the tables 202 of the historian 100 are described briefly herein below.

Timestamps

The historian 100 tables data received from a variety of "real-time" data sources, including the I/O Servers 104 (via the data acquisition service 116). The historian 100 is also capable of accepting "old" data from sources such as text files. By way of example, "real-time" data can be defined to exclude data with timestamps outside of ±30 seconds of a current time of a clock maintained by a computer node hosting the historian 100. However, data characterizing data is also addressable by a quality descriptor associated with the received data. Proper implementation of timestamps requires synchronization of the clocks utilized by the historian 100 and data sources. In an exemplary embodiment, all data values are assigned UTC timestamps. However, this is not essential for carrying out the present invention. The client application need only know, through implicit/explicit designation, the time zone assigned to the timestamp for a data point value.

Quality

The Historian 100 supports two descriptors of data quality: "QualityDetail" and "Quality." The Quality descriptor is based primarily on the quality of the data presented by the data source, while the QualityDetail descriptor is a simple indicator of "good", "bad" or "doubtful", derived at retrieval-time. Alternatively, the historian 100 supports an OPCQuality descriptor that is intended to be used as a sole data quality indicator that is fully compliant with OPC quality standard(s). In the alternative embodiment, the QualityDetail descriptor is utilized as an internal data quality indicator.

Value

A value part of a stored piece of data corresponds to a value of a received piece of data. In exceptional cases, the value obtained from a data source is translated into a NULL value at the highest retrieval layer to indicate a special event, such as a data source disconnection. This behavior is closely related to quality, and clients typically leverage knowledge of the rules governing the translation to indicate a lack of data, for example by showing a gap on a trend display.

The following is a brief description of the manner in which the historian 100 receives time-series data for observed parameters from a real-time data source and stores the data as a timestamp, quality and value combination in one or more of its tables 202. The historian 100 receives a data point for a particular tag (named data value) via the storage interface 200. The historian compares the timestamp on the received data to: (1) a current time specified by a clock on the node that hosts the historian 100, and (2) a timestamp of a previous data point received for the tag. If the timestamp of the received data point is earlier than, or equal to the current time on the historian node then:

If the timestamp on the received data point is later than the timestamp of the previous point received for the tag, the received point is tabled with the timestamp provided by the real-time data source.

If the timestamp on the received data point is earlier than the timestamp of the previous point received for the tag (i.e. the point is out of sequence), the received point is tabled with the timestamp of the previously tabled data point "plus 5 milliseconds". A special QualityDetail value is stored with the received point to indicate that it is out of sequence (the original quality received from the data source is stored in the "quality" descriptor field for the stored data point).

On the other hand, if the timestamp of the point is later than the current time on the historian 100's node (i.e. the point is in the future), the point is tabled with a timestamp equal to the current time of the historian 100's node. Furthermore, a special value is assigned to the QualityDetail descriptor for the received/tabled point value to indicate that its specified time was in the future (the original quality received from the data source is stored in the "quality" descriptor field for the stored data point).

The historian 100 can be configured to provide the timestamp for received data identified by a particular tag. After proper designation, the historian 100 recognizes that the tag identified by a received data point belongs to a set of tags for which the historian 100 supplies a timestamp. Thereafter, the timestamp of the point is replaced by the current time of the historian 100's node. A special QualityDetail value is stored for the stored point to indicate that it was timestamped by the historian 100. The original quality received from the data source is stored in the "quality" descriptor field for the stored data point.

It is also noted that in an exemplary embodiment the historian 100 supports application of a rate deadband filter to reject new data points for a particular tag where a value associated with the received point has not changed sufficiently from a previous stored value for the tag.

Having described a data storage interface for the historian 100, attention is directed to retrieving the stored data from the tables 202 of the historian 100. Access, by data acquisition interfaces of clients of the historian 100, to the stored contents (e.g., time-series data values for observed parameters) of the tables 202 is facilitated by a retrieval interface 206. The retrieval interface 206 exposes a set of functions/operations/methods callable by the data acquisition interfaces of client applications residing on client nodes attached to the network 110 (e.g., a trending client application executing on node 112a), for querying the contents of the tables 202.

In response to receiving a query message, the retrieval interface 206 supplies timestamped series data to the requesting client application. In an exemplary embodiment, the timestamps for the data provided via the retrieval interface 206 of the historian are based upon any time zone standard specified by the client application (e.g., UTC). The client applications, by way of example, request and store time-series data values from the retrieval interface 206 of the historian 100 according to a single time zone standard (e.g., UTC). Alternatively, the client applications convert the timestamps of received time-series data values to the single time zone standard upon receipt from the historian 100. Furthermore, in accordance with exemplary embodiments, after receiving the requested data, the client application invokes a filtering operation to reduce the set of points, representing the value of a watched parameter, plotted over a time period of interest on a graphical display. An exemplary set of filtering operations supported by the client application are enumerated in FIG. 3 described herein below.

Figure 3:
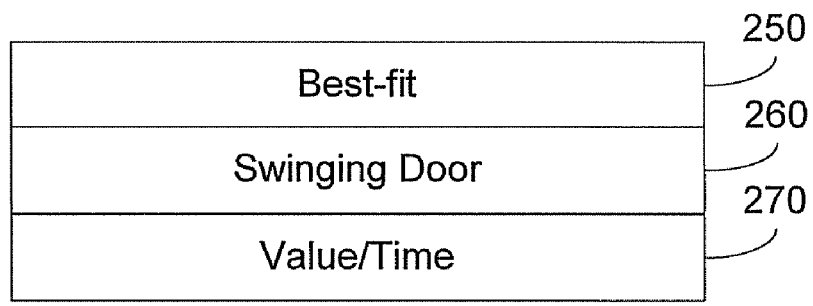
FIG. 3 is a set of data filtering operations supported by (or for) a client application embodying the present invention.

Turning to FIG. 3, an exemplary set of advanced data filtering/display modes are supported by the client application on node 112a. The advanced data filtering/display modes are facilitated by the set of advanced data retrieval operations 204 enumerated in FIG. 3. The set of filters are capable of operating on rows of data (grouped as cyclic buckets) associated with a single, specific tag, or alternatively a set of specified tags. Furthermore, in the illustrative embodiment each of the filtering operations is implemented as a distinct object class from which instances are created and started either at start-up, or alternatively, upon the client receiving a particular type of data retrieval/presentation request.

In an exemplary embodiment, the filtering operations support options for tailoring data retrieval and processing tasks performed by the operation in response to a request. Options specified in a request invoking a particular filtering operation include, for example, an interpolation method, a timestamp rule, and a data quality rule. Each of these three options is described herein below.

Figure 4A:
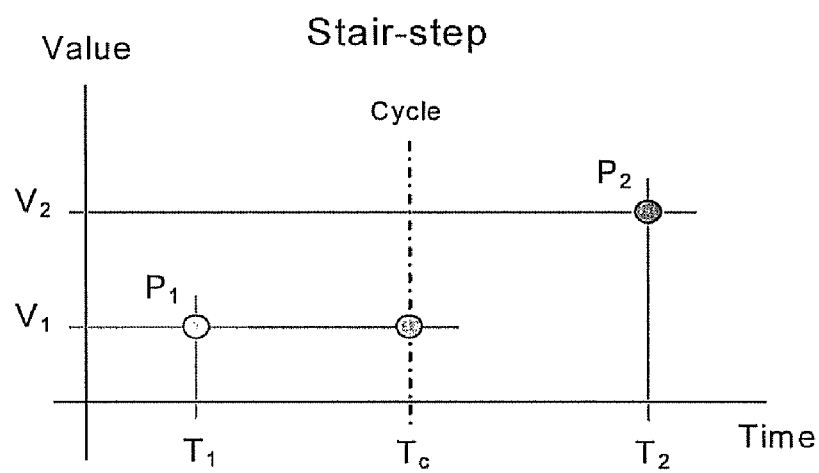
FIGS. 4*a* and 4*b* graphically depict stair-step and interpolated data processing.

With regard to the interpolation method option, wherever an estimated value is to be returned for a particular specified time, the returned value is potentially determined in any of a variety of ways. In an illustrative example, the filtering operations support stair-step and linear interpolation. In the stair-step method, the operation returns the last known point, or a NULL if no valid point can be found, along with a cycle time with which the returned stair-step value is associated. Turning to the example illustrated in FIG. 4a, where the client application operation receives a request for a "stair-step" value for a cycle having a boundary at time $T_c$, and the most recent point stored for the tag is $P_1$, the operation extends the last stored value assigned at $P_1$ and returns the value $V_1$ at time $T_c$.

Figure 4B:
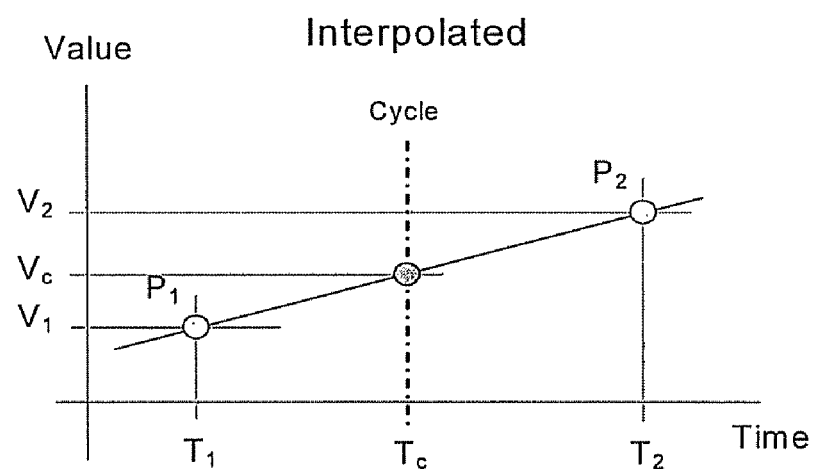

Alternatively, linear interpolation is performed on two points to render an estimated value for a specified time. Turning to the example illustrated in FIG. 4b, where the client application receives a request for a linearly interpolated value for a cycle boundary at time $T_c$, and the most recently stored point for the tag is $P_1$, and the first point stored beyond $T_c$ is $P_2$, the client linearly interpolates between points $P_1$ and $P_2$. It is possible that one of the points will have a NULL value. If either of the points is NULL value, then $P_1$ is returned at time $T_c$. If both points are non-NULL, then the value $V_c$ is returned as the value where the line through both points intersects with the cycle boundary, and the value $V_c$ at time $T_c$ is returned to the client. Expressed in a formula $V_c$ is calculated as:

$$V_c = V_1 + ((V_2 - V_1) * ((T_c - T_1)/(T_2 - T_1))) \text{ for } (T_2 - T_1) \neq 0.$$

In an exemplary embodiment, whether the stair-step method or linear interpolation is used, if not overridden, is specified by a setting on a requested tag (for which data values are to be displayed). If the setting is 'system default', then the system default is used for the tag. A client can override a specified system default for a particular query and designate stair-step or linear interpolation for all tags regardless of how each individual tag has been configured.

The "data quality" rule option on filtering operation request controls whether points with certain characteristics are explicitly excluded from consideration by the algorithms of the filtering operations. By way of example, a request optionally specifies a data quality rule, which is handed over to a specified filtering operation. A request optionally specifies a quality rule (e.g., reject data that does not meet a particular quality standard in a predetermined scale). If no quality rule option is specified in a request, then a default rule (e.g., no exclusions of points) is applied. In an exemplary embodiment, the request specifies a quality rule requiring the responding filtering operation to discard/filter retrieved points having doubtful quality—applying an OLE for process control (OPC) standard. The responding operation, on a per tag basis, tracks the percentage of points considered as having good quality by an algorithm out of all potential points subject to a request, and the tracked percentage is returned.

The time stamp rule option applied to a request to display data values for an identified parameter/tag controls whether cyclic results are time stamped with a time marking the beginning of a cycle or the end of the cycle. In an illustrative example, a requestor optionally specifies a time stamp rule, and the time stamp is handed over to the operation. Otherwise, if no parameter is specified, then a default is applied to the filtering operation.

Turning to the set of operations listed in FIG. 3, a best fit filtering operation 250, used most appropriately for analog signals/values, calculates values to be provided to a point plotting process of the client application over a period of time by dividing a period of interest into a set of sub-periods, and for each sub-period, applies a filtering rule to render a set of value representing the set of values provided during the sub-period. The best fit filtering operation 250 uses cyclic buckets, but it is not a true cyclic operation. Apart from an initial value for a cycle or sub-period, the best fit operation 250 only returns actual delta points (i.e., where a parameter has changed value). The best fit operation 250 receives previously tabled data. The best fit filtering operation 250 applies the best fit algorithm (described below) to the received values in view of a specified resolution (sub-period duration). For best fit and other filtering operations, the user can specify the resolution indirectly by specifying a cycle count. The returned data values typically number more than one per cycle. An option available for the best fit data filtering operation 250 allows overriding the interpolation type for the calculation of initial values. The best fit filtering operation 250 applies the best fit algorithm to all points found in any given cycle.

In an exemplary embodiment, up to five delta points are generated within each cycle (displayed sub-period) for each tag: the first value, the last value, the min value, the max value and the first occurrence of any existing exceptions. If one point fulfills multiple designations, then the data point is returned only once. In a cycle where a tag has no points, nothing will be returned. The best fit operation 250 is, by way of example, applied to analog tags. All points are placed in chronological order for display, and if multiple data points are to be plotted for a particular time stamp, then those points will be returned in the order in which the respective tags were listed in a query.

Figure 5:
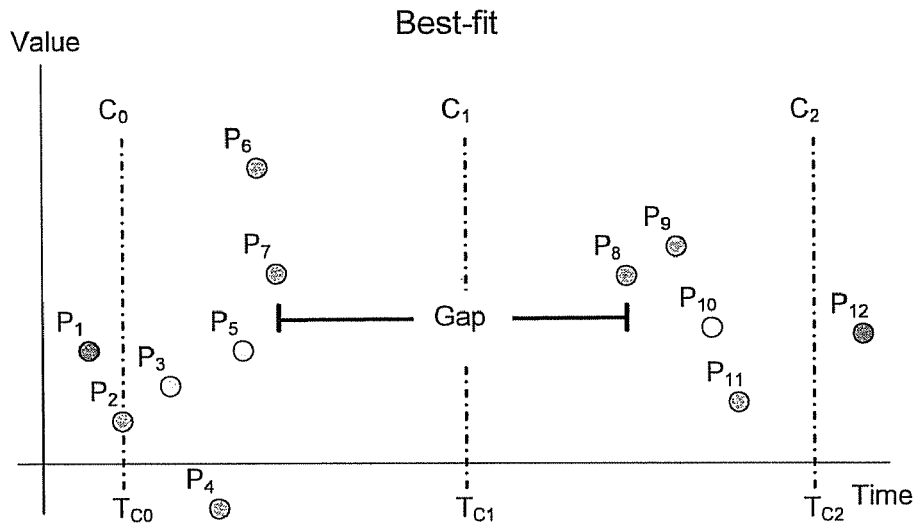
FIG. 5 depicts an illustrative sequence of data points for the purpose of demonstrating a best fit data compression/filtering/selection operation.

FIG. 5 shows an illustrative example of selecting points based upon a best fit filtering operation. In the example the best fit filtering operation 250 commences with a start time of $T_{C0}$ and an end time of $T_{C2}$. The resolution of the request is set such that data is returned for two complete cycles starting at $T_{C0}$ and $T_{C1}$ and an incomplete cycle starting at $T_{C2}$. For the queried tag we again find a total of twelve points throughout the cycles represented by the dots marked $P_1$ through $P_{12}$. Of these points eleven represent normal analog values, and one, $P_7$, represents a NULL due to an I/O server disconnect, which causes a gap in the data between $P_7$ and $P_8$. Two points, $P_1$ and $P_{12}$, are not considered at all. $P_1$ is not considered because $P_2$ is located exactly at the start time and there is no need to interpolate. $P_{12}$ is not considered because it is outside of the queried time frame. All other points are considered. However, for the reasons provided below, only data points 2, 4, 6, 7, 8, 9 and 11 are returned.

With continued reference to FIG. 5, four points are returned from the first cycle. $P_2$ is returned as the initial value of the query as well as the first value in the cycle. $P_4$ is returned as the minimum value in the cycle. $P_6$ returned as the maximum value and the last value in the cycle. $P_7$ is returned as the first occurring—and in this case the only—exception in the cycle. In the second cycle three points are returned. $P_8$ is returned as the first value in the cycle. $P_9$ is returned as the maximum value in the cycle. $P_{11}$ is returned as both the minimum value and the last value in the cycle. As no exception occurs in the cycle, no point will be returned for this aspect of the best fit operation 350 for the second cycle. No points are returned for the incomplete third cycle starting at the query end time because the tag (associated with the displayed points) does not have a point exactly at that time.

Returning to the set of operations listed in FIG. 3, a swinging door filtering operation 260, used most appropriately for analog signals/values, calculates values to be provided to a point plotting process of the client application over a period of time by applying a combination of a value, rate and time deadband to an input stream. The value deadband is applied first and eliminates low-level noise. Then the rate deadband compares a slope between the last two points actually plotted with the slope between the last point plotted and the current point of interest. If the slope is within the deadband, then the current point is filtered out. The time deadband overrides values otherwise filtered from the input stream and ensures that at least one point is plotted for a period specified by the time deadband. The first and last points are always included. An exemplary swinging door filtering operation/method is provided in FIGS. 6-9.

As noted above, the swinging door filtering operation 260 applies a configurable value/rate of change deadband compression operation, including a time period override. The swinging door filtering operation 260 addresses a need to draw (plot on a graphical display) compressed data in a manner such that the data streams provided to a data plotting component of a client application reasonably reflect the signal information originally received by the client application from the historian 100. The filtering/compression operation determines whether to store/plot or discard a newly received value (data point) for a particular tag where a value associated with the received data point has not changed sufficiently from a previous stored/plotted value for the tag. In an exemplary embodiment, a configuration interface associated with the swinging door filtering operation 260 allows an administrator to determine, for each data stream to be plotted on a graphical display: (1) whether value deadband compression is enabled (and the magnitude of the value deadband); (2) the magnitude of the rate of change deadband; and (3) whether time period overrides are enabled (and the magnitude of the time periods). The compression stages/steps are illustratively depicted in a flow diagram FIG. 6 described herein below.

Figure 6:
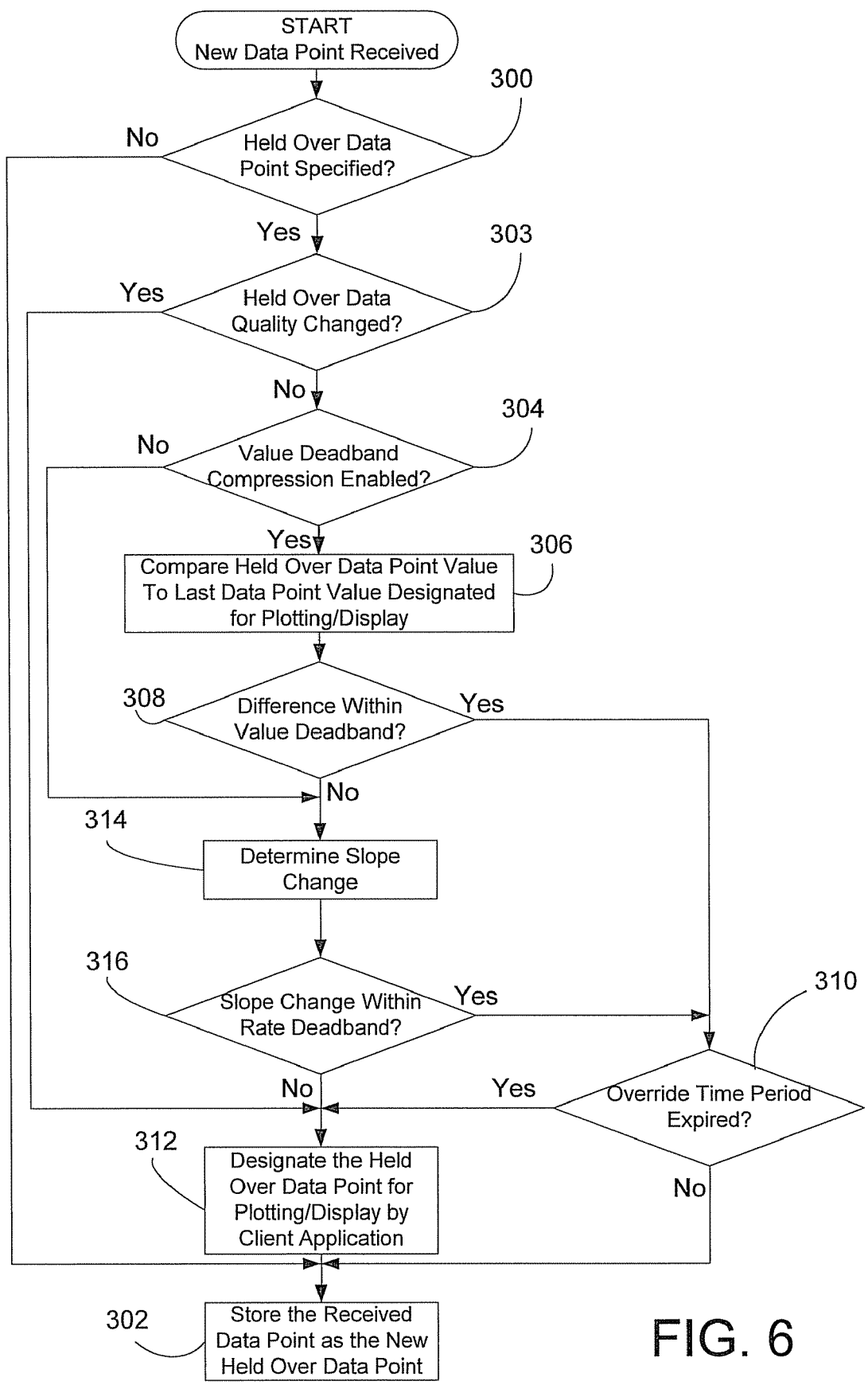
FIG. 6 is a flow diagram depicting the general steps performed by the data compression interface on each received point value when swinging door data compression is enabled for a steam of time series data point values.

FIG. 6 summarizes a set of steps describing the general operation of a time-series data compression operation that abstracts/reduces, prior to plotting on a graphical display of a client application, the content of received data streams corresponding to a set of tracked process control system information points. The abstracted data is thereafter plotted on a graphical display associated with the application client. It is noted that the present invention is not to be limited by the disclosed specific steps and their order of execution. As those skilled in the art will appreciate from the disclosure contained herein, the tests (e.g., rate change deadband, value change deadband, forced store period override, etc.), the points used to carry out the tests, and the resulting actions can be modified in accordance with alternative embodiments of compression operations falling within the scope of the invention. For example, the choice of data points used to calculate a rate change and a change in data point value, for purposes of applying the rate and value deadband tests, differs in alternative embodiments. Furthermore, the order in which the deadband and time-period based tests are performed differ in various embodiments.

The data compression decision steps described herein below rely upon the following three points: a last drawn/plotted data point, a held over data point, and a received data point. The last data point designated to be drawn/plotted corresponds to the most recent (by timestamp) data point committed to the set of data points for a tag for plotting on the client application's graphical display. The "held over data point" corresponds, by way of example, to the last received data point. The "received data point" corresponds to the data point received by the swinging door filtering operation 260 that resulted in the commencement of the steps set forth in FIG. 6.

The compression operation summarized in FIG. 6 applies two deadbands. First, an optional value deadband ensures that two compared values are sufficiently different. Second, a slope (rate) change deadband determines whether a slope has changed sufficiently between two segments defined by at least three distinct received points to justify storing/plotting an intermediate one of the three points. While known compression algorithms (described above in the discussion of the prior art) apply tests to either accept (for drawing/plotting) or discard a most recently received data point, it is noted that the compression method described below holds over the most recently received data point until a next data point has been received. Only after a next data point is received do the compression decision steps summarized in FIG. 6 determine whether to accept (for drawing/plotting) or discard the "held over" data point.

It is noted that a first data point (e.g., the first ever received or first after a previous disconnect), in a stream of data points for a particular tagged process variable, is automatically stored (for plotting) as an initial reference point. The flowchart depicted in FIG. 6 assumes that this value has been stored and the steps address the subsequently received points. Thus for all points received thereafter, the data point stream compression procedure including the steps depicted in FIG. 6 are commenced in response to the swinging door filtering operation 260 receiving a new data point specifying a value and timestamp for a particular tagged variable associated with the status/operation of a process control and manufacturing information system.

Thereafter, during step 300, the swinging door filtering operation 260 determines whether the held over data point has been specified. If no held over data point presently exists, then control passes from step 300 to step 302. At step 302 the received data point is stored as the held over data point that will be used when a next data point is received. If the held over data point exists, then control passes to step 303.

In an exemplary embodiment, the filtering operation 260 considers data quality in addition to the value aspect of the held over data point. Therefore, in the illustrative embodiment, at step 303 the filtering operation 260 determines whether the quality assigned the held over data point differs from the quality assigned to a last data point designated to be plotted. If the data quality has indeed changed, then control passes to step 312 (described further herein below) wherein the held over data point is designated for plotting on the client application's graphical interface. Otherwise, if the data point quality has not changed, then control passes to step 304.

At step 304 swinging door filtering operation 260 determines whether a value deadband compression function is enabled. The value deadband compression function is driven by a configurable offset magnitude that identifies neighboring points having sufficiently the same magnitude to warrant discarding at least one of the data points (e.g., a subsequently received one of two data points) in a stream of data points for a process variable. If the value deadband compression function is enabled, then control passes to step 306. At step 306, the held over point value is compared to the last accepted data point for plotting. The most recently received data point value is not used to perform either step 306 or step 308. Next, at step 308 if the magnitude of the difference between the held over data point value and the last plotted data point value is within a deadband offset value, then the held over data point can potentially be discarded (without storing/plotting the value) since its value is not sufficiently different from the last data point designated for plotting. Therefore, if the difference is within the value deadband, then control passes from step 308 to step 310.

An exemplary embodiment supports specifying a deadband override period that ensures at least one previously held over point value is accepted/designated for plotting within the specified deadband override period commencing after a last accepted data point. At step 310, the swinging door filtering operation 260 performs a time period-based deadband override test. The override test carried out during step 310 ensures that excessively long periods of time do not pass between plotted points. To ensure that such goals are met, prior to discarding a held over point because it fell within a deadband, at step 310 the swinging door filtering operation 260 determines the elapsed time between the last data point designated for plotting and the current received data point. If the elapsed time exceeds a specified override time span, then control passes to step 312. At step 312 the swinging door filtering operation associated with the client application designates the held over data point for plotting on the graphical display of the client application. Control then passes to step 302 wherein the received data point is stored as the held over data point (in preparation for processing a next received data point). If the elapsed time does not exceed the override time period, then control passes from step 310 to step 302.

It is noted that an illustrative embodiment allows the deadband override to be selectively disabled/enabled. If the deadband override is disabled, then all points that fall within specified value/rate deadbands are discarded upon timely receipt of a next data point (which starts the deadband test sequence).

Figure 7:
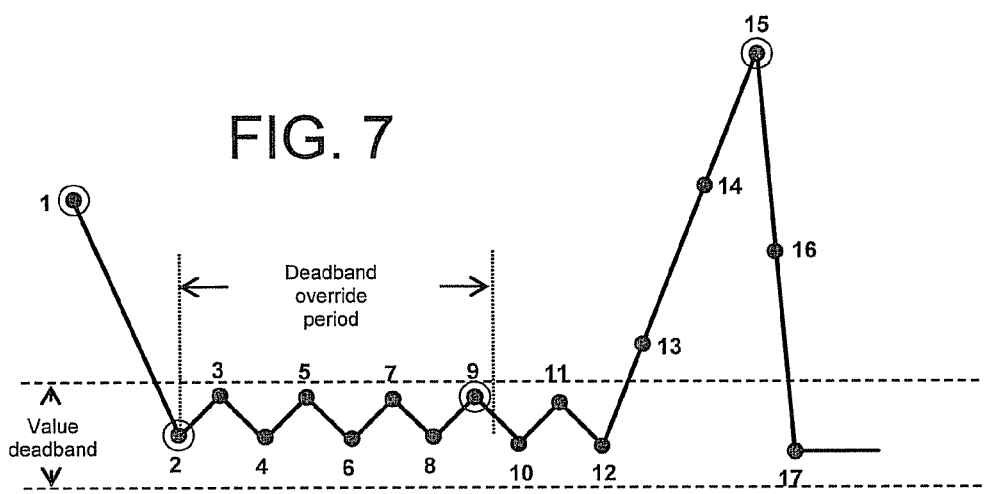
FIG. 7 illustratively depicts a sequence of received values and the effect of the data compression method of FIG. 6, including value and rate deadbands with a deadband override period, on designating the set of received data points that will be plotted on a client application's graphical display.

Tuning briefly to FIG. 7, the effect of the override operation of steps 310 and 312 is graphically depicted. After data point 10 is received (and data point 9 is presently the held over data point), during step 310 the swinging door filtering operation 260 determines the elapsed time since the last accepted data point (data point 2) exceeds the specified deadband override period. The held over data point 9 is therefore accepted for plotting regardless of whether it falls outside either of the value and rate deadbands. A "deadband-overridden" point (e.g., data point 9) is treated no differently than any other accepted point. In the example in FIG. 7, once point 9 is designated for plotting and point 10 becomes the held over point, subsequent rate calculations use the slope between points 9 and 10 as the baseline for subsequent data point filtering decisions. The deadband override period can have any value, and is not related to a real-time window period (described herein below with reference to FIGS. 8 and 9).

Returning to step 308 if the difference between the last accepted data point's value and the held over data point value is not within the specified deadband, then control passes to step 314 wherein a rate of change deadband test commences. In the rate of change deadband test, the slopes of two data segments are compared. In an exemplary embodiment the two data segments are defined by at least: the last accepted data point, the held over data point, and the received data point, are compared. If the slopes differ in substantially, then the held over point—which is located in a time sequence between the last stored value and the received value—can potentially be discarded. If the value deadband test is not enabled, then control passes from step 304 to 314.

Steps 314 and 316 embody an exemplary slope change deadband test (one of many potential alternative tests) for determining whether to accept (designate for plotting) or discard a held over point. During steps 314 and 316 the swinging door filtering operation 260 determines whether the slopes of the two compared segments are sufficiently different to warrant accepting the held over data point. At step 314, the filtering operation 260 determines a difference between a first segment defined by the last stored data point and a first subsequently received/held over data point, and a second segment defined by the current held over data point and the current received data point.

In the illustrative embodiment the slope of the first segment is kept and reused until a new last accepted data point is established. Thus, turning briefly to the example set forth in FIG. 8, when data point 1 is accepted for plotting, the slope between point 1 and point 2 is saved as the "previously stored slope" until point 6 is received. A comparison between the slopes of segment 1-2 and segment 5-6 results in accepting data point 5, and the slope between data points 5 and 6 is saved as the "previously stored slope" until a next data point (i.e., data point 10) is accepted/designated for plotting.

In an alternative embodiment the first segment (utilized during step 314) is updated each time a new held over point is established. This alternative, while potentially consuming more processing cycles (to calculate an updated first segment), potentially provides a better first segment slope for comparing to the second segment slope—which is defined by the held over and received data point values.

There are many ways to specify a slope/rate of change deadband in accordance with alternative embodiments. Returning to FIG. 8 for purposes of describing the application of a rate deadband test, a sequence of received data points is depicted. In the case depicted in FIG. 8, it is assumed that value deadband compression has been disabled. Data point 0 has been stored on disk. Data point 1 is the held over data point. Thereafter, the swinging door filtering operation 260 receives data point 2 and calculates a change in slope. In the exemplary embodiment, the change in slope is calculated as a percentage of a previously stored slope. In particular, when data point 2 is received, at step 310 the storage engine calculates the change in slope as follows:

---
Slope0_1 = (Value1 − Value0) / (Time1 − Time0)
Slope1_2 = (Value2 − Value1) / (Time2 − Time1)
*Test for Slope0_1 = 0
If Slope0_1 = 0 then Percent > Rate Deadband
else Slope_change_Percent = |100*(|Slope1_2 − Slope0_1| / Slope0_1)|

---

The above equation for calculating a "slope change percent" presents a potential "divide by zero" error (if slope0_1 equals zero). A conditional is therefore interposed between calculating the slope of the denominator and calculating the slope change percent. If the denominator is zero, then the slope change percent calculation is by-passed (and the slope change is considered sufficient for purposes of the deadband applied during step 316). In an alternative embodiment, the slope change is calculated as a difference (e.g., slope 1–slope 2) rather than a percentage. In yet another, hybrid value/rate deadband embodiment the rate change test is performed by extending/extrapolating a line defined by the last stored data point and held over data point to a time corresponding to the received data point. If a value for a point on the line corresponding to the timestamp of the received data point is sufficiently close to the value of the received data point, then the held over data point is not stored (i.e., the value/rate deadband is not exceeded).

After determining the slope change, control passes from step 314 to step 316 wherein, a rate of change criterion is applied to determine whether the slope change determined during step 314 is within a specified/configurable rate change deadband. By way of example, if the Slope_Change_Percent>Rate_Deadband_Percent (e.g., 10 percent), then the slope has changed sufficiently, and control passes to step 312 wherein the held over data point is accepted/designated for plotting/display by the client application user interface. Alternatively, instead of a specified percent value, during step 316 the test for determining whether the slope has changed sufficiently comprises comparing a slope difference to a specified slope difference deadband value. In the other proposed hybrid value/rate comparison alternative, where a line segment is extended for the purpose of making a comparison, the change is expressed in actual measurement units On the other hand, if the swinging door filtering operation 260 concludes, at step 316 that the slope change determined during step 314 is not sufficiently large (i.e., the change is within the specified deadband), then control passes from step 316 to step 310 (described above) where a time override is applied.

Figure 8:
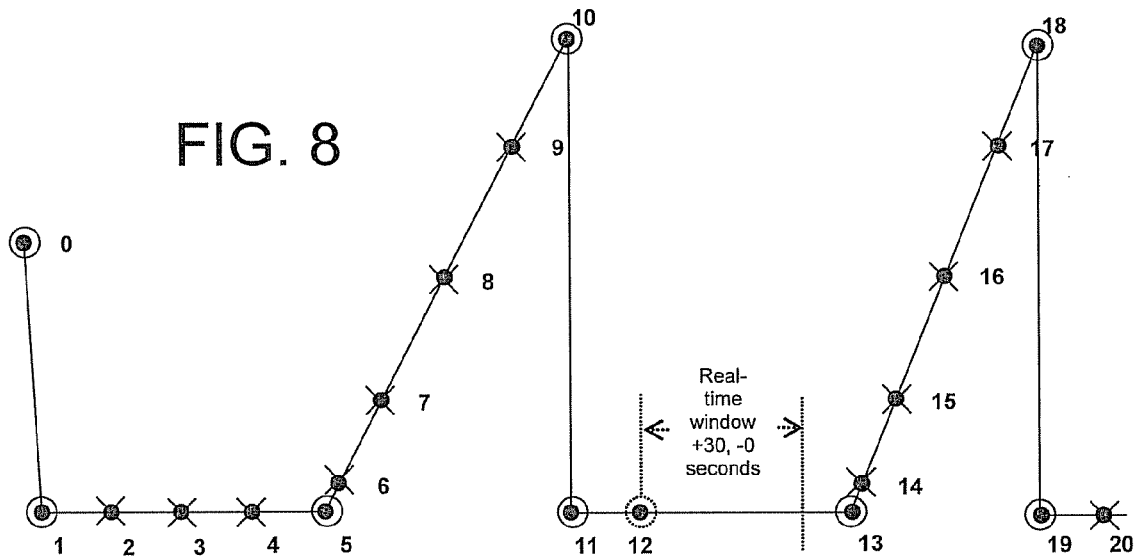
FIG. 8 illustratively depicts a sequence of received values and the effect of the data compression interface, including a rate deadband and real-time window, on designating the set of received data points for display.

With further reference to FIG. 8, it is noted that with regard to the subsequently received points after point 2, the slope (that is assumed not to be zero for purposes of this example/discussion) has not changed between points 2 through 5, and therefore as points 2 through 5 are received and processed, none of these points are designated for plotting as a result of the test performed during step 316. It is noted that if the slope was indeed zero, then each of the intervening points would have been stored due to the divide by zero condition. However, when point 5 has been designated as the held over point and data point 6 is received, the rate deadband criterion is satisfied (slope change between points 1-2 and points 5-6 is greater than the specified rate deadband), and point 5 is designated for plotting. Point 6 is subsequently discarded because the slopes between the two line segments defined by data points 5, 6 and 7 are not substantially different. The next point where the slope changes significantly is at the segment defined by points 10 and 11. After point 11 has been received, during step 314 the slopes of the segment 5/6 and segment 10/11 are used to determine the slope change. Thereafter, at step 316 the swinging door filtering operation 260 determines that the slope differences indeed fall outside the rate deadband. Control thereafter passes to step 312 wherein the held over data point 10 is designated for plotting. Control then passes to step 302 wherein the received data point 11 is stored as the new held over data point.

It is noted that the disclosed set of data compression steps can be, and indeed are, supplemented by a real-time period timer-based forced storage procedure. Such procedure, described herein below with reference to FIGS. 8 and 9, causes a held over data point to be designated for plotting on the client application's associated graphical display even though a subsequent data point has not yet been received. Such forced storage period is preferably set at a value that is less than a time period used to designate a received data point as "real-time". An example of such a period is 30 seconds.

Figure 9:
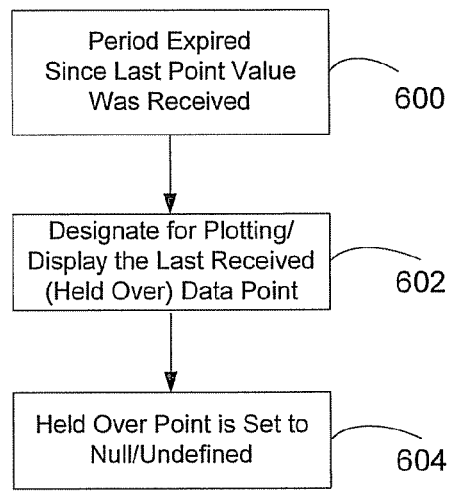
FIG. 9 is a flowchart summarizing a real-time forced storage window method.

Turning to FIG. 9, a flowchart summarizes a set of steps for applying a real-time window forced display requirement to a stream of received data points for a particular tagged variable. In contrast to the deadband forced display period, the real-time window begins at the time specified on a timestamp for a held over data point. Upon expiration of the time period at step 600, control passes to step 602. At step 602 the swinging door filtering operation 260 designates the previously received/held over data point for plotting/display on the graphical interface of the client application. Next, at step 604, the held over data point is specified as Null/Undefined. Thus, when a next data point is received, the swinging door filtering operation 260, applying the steps summarized in FIG. 6, will determine that there is no presently specified held over point and therefore by-pass the deadband tests. The received point is merely stored as the new held over data point.

Referring to FIG. 8, for purposes of illustrating the effect of the "real-time" window timer, data point 13 illustrates the effect of the real-time window setting. Under normal circumstances, data point 12 would not qualify for being plotted. If, however, the elapsed time between the timestamp specified for received data point 12 and data point 13 exceeds the time period window in which the data point 12 is storable as a real-time point (e.g., the specified real-time window is 30 seconds and the elapsed time between points 12 and 13 is greater than 30 seconds), data point 12 is plotted anyway. Furthermore, a system tag counting "extra" points plotted as a result of an insufficient real-time window is incremented. In other words, if while waiting for data point 13 to arrive, the timestamp of data point 12 becomes so old that it reaches the limit of the real-time window, then data point 12 is designated for plotting/display without consideration of the tests set forth in FIG. 6.

Returning to FIG. 3, a value/time filtering operation 270 is most appropriate for discrete measurements represented as integer values. The value/time filtering operation 270 includes two distinct filters. A first filter discards a string of time-series values for a tag/parameter that fall within a deadband centered, for example, on a most recently designated/plotted value for the tag/parameter. A second filter discards a string of time-series values for a tag/parameter having a timestamp falling within a designated period. By way of example, after a value is stored for a tag/parameter, a hold period commences where all values for the tag/parameter having time stamps falling within the hold period are not plotted on the graphical display.

Figure 10:
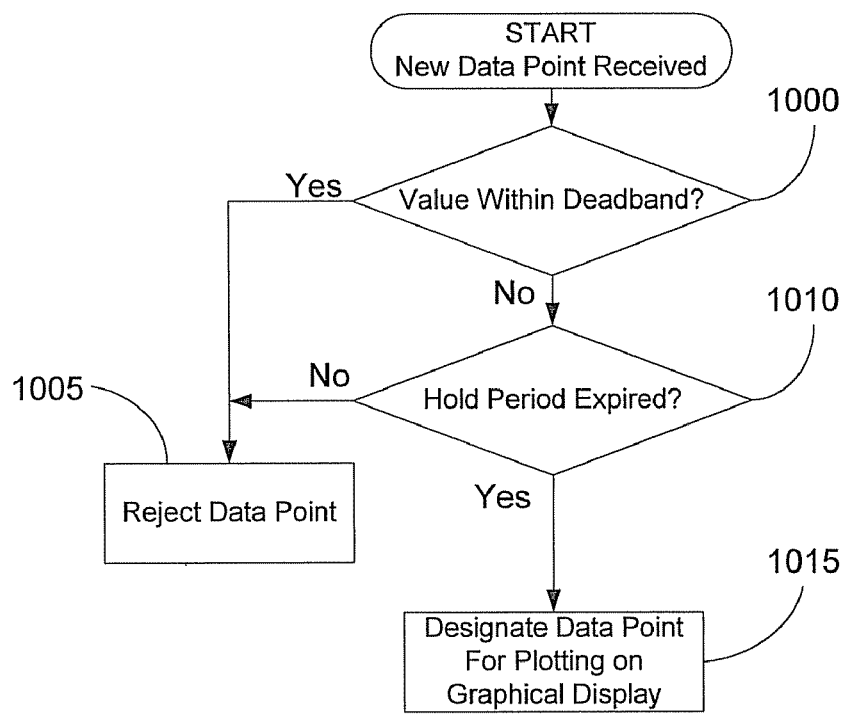
FIG. 10 is a flowchart summarizing operation of a value/time filter on a set of received data values.

Turning to FIG. 10, a set of steps summarize processing a received data point by the value/time filtering operation 270. As each point is received for processing by the filtering operation during step 1000 a value-based filter is applied, and an initial comparison is performed between the received data point value and a last accepted data point value. If the magnitude of the difference less than a specified value defining the deadband, then control passes to step 1005 and the data point is rejected for purposes of plotting on the graphical display associated with the client application. If, however, the difference indicates that the value of the received data point is outside the deadband, then control passes to step 1010.

During step 1010, a time filter is applied to the timestamp associated with the received data point. If the timestamp falls within a hold period defined by the timestamp and a specified duration (e.g., one second) where data points are discarded regardless of whether they fall outside the deadband. At step 1010, if the timestamp difference between the received data point and a most recently received data point does not exceed the hold period duration (e.g., 1 second), then control passes to step 1005. As an alternative to the above-described hold period test during step 1010, a hold period criterion can merely specify that during any given fixed time period only a limited number of data point values (e.g., one) will be plotted. In this alternative embodiment, the timestamp of a last accepted data point value is not needed since the beginning of the periods are determined by an independent timer that measures the fixed time periods. If the hold period test is met during step 1010, then control passes to step 1015. During step 1015 the received data point is designated for plotting on the client application's graphical display.

Having described an exemplary value/time filtering operation 270 with reference to FIG. 10, it is noted that a variety of alternative value/time filtering operations are contemplated in alternative embodiments. In addition to the above-mentioned variation on the "hold period" test, the value test performed during step 1000 can take on a variety of forms. Furthermore, while the exemplary value/time filter is performed on discrete data values, in alternative embodiments, the value/time filter operation is carried out on analog values. Furthermore, the order of performing the value and time filtering tests is switched in alternative embodiments such that step 1010 is performed prior to deadband testing in accordance with step 1000.

It is noted that the data point plot filtering operations performed by the client application, and identified by way of examples specified in FIG. 3, are used to determine whether a received data point is plotted/drawn on a graphical display associated with the client application. Thus, in embodiments of the client application time-stamped data point values rejected by any of the above-described filters are still used to perform other analytical computations supported by the client application. In other embodiments the rejected data points are not used subsequently for any purpose by the client application.

Figure 11:
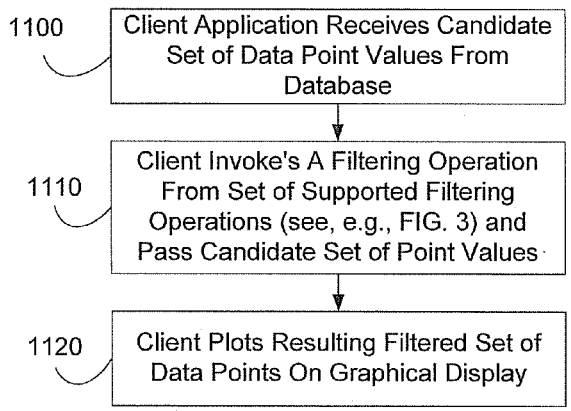
FIG. 11 is a flowchart summarizing the operation of a client application to receive, filter, and then plot a set of time-series data values.

Turning to FIG. 11, a set of stages are summarized for an exemplary client application's processing of a series of time-stamped data values for a parameter/tagged variable. Initially, during stage 1100, a candidate set of values are received by the client application for plotting on a graphical display. The input set of data values is potentially pre-filtered by other processes—such as ones associated with a process database from which the data values have been received. In other cases, the values have not previously been filtered. Next, during stage 1110, the client application invokes a filtering operation to potentially reduce the number of data values that are actually plotted on a graphical display with which the client application is associated. It is noted that the filtering operations can be implemented in a variety of ways including, for example, integrated components of the client application. In other embodiments, the filtering stage 1110 invokes an external application/component to carry out the actual filtering. After obtaining the designated set of data point values to be plotted by the client application, during stage 1120 client application plots the designated set of points on its associated graphical display.

Figure 12:
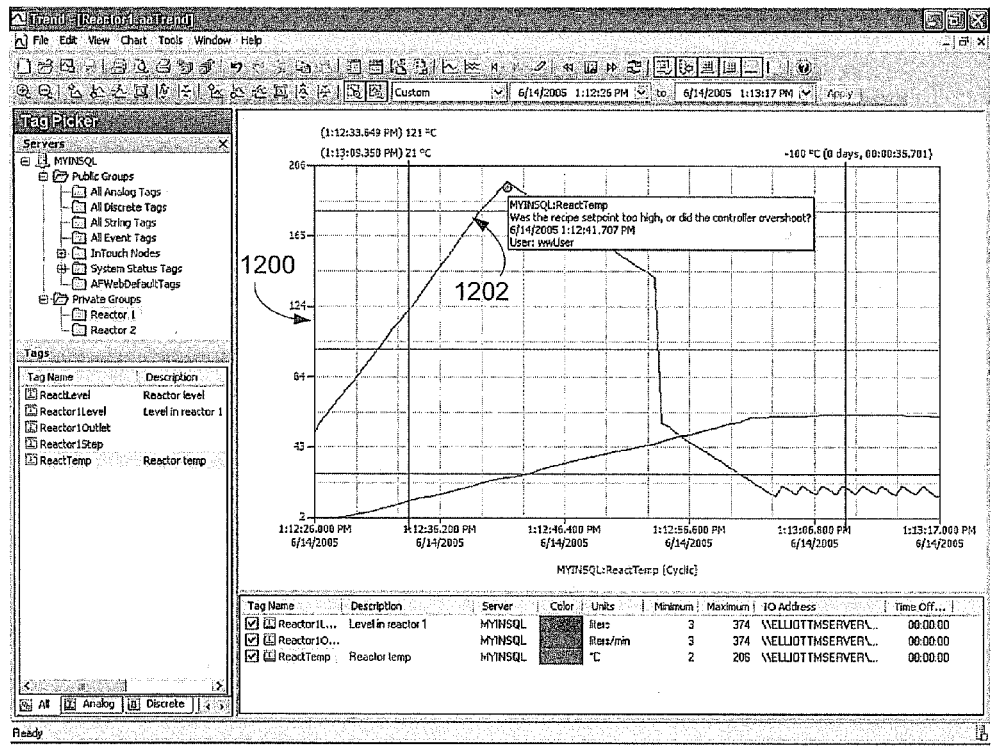
FIG. 12 is an exemplary graphical user interface for a client application depicting a time sequenced graphical representation of a variable value based upon a series of filtered and plotted values.

An example of such a display for the client application is provided in FIG. 12. In the example, a graphical interface for the client application comprises a line graph display 1200 that plots a set of points associated with a process. Rather than plot every single point on the line, filtered data values are plotted and thereafter connected by an appropriately colored line to form a line graph (e.g., line graph 1202).

It is noted that in exemplary embodiments the set of filtering operations supported by the client application is extensible. The extensible nature of the client application's data filtering set ensures that as additional needs are identified, new filtering operations are developed and incorporated within the client application's operations. A desired one of the supported filtering operations is specified by a configurable option for a particular trending view.

Particular ones of the supported operations are invoked in a variety of ways. In an illustrative example, the operations are invoked as OLE extensions to a standard/base interface. In an alternative example wherein one or more of the received data point filtering operations are implemented by object instances (e.g., COM/DCOM objects), a client application invokes the particular filtering operation of interest through a call to an object instance for designating particular ones of a set of provided data points to be plotted/drawn on the client application's graphical display.

In view of the many possible embodiments to which the principles of this invention may be applied, it should be recognized that the embodiments described herein with respect to the drawing figures, as well as the described alternatives, are meant to be illustrative only and should not be taken as limiting the scope of the invention. The functional components disclosed herein can be incorporated into a variety of programmed computer systems as computer-executable instructions (provided on a computer-readable medium) in the form of software, firmware, and/or hardware. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A process control and manufacturing information database client application including a graphical display interface for plotting and presenting received time-series data, the client application comprising:

a data acquisition interface for obtaining a set of timestamped time-series data values for an observed parameter from a process control and manufacturing information database;

a time-series data filter including at least one filtering operation applied to the set of timestamped time-series data values to render a filtered data set for plotting on the graphical display interface; and a display function for rendering the filtered data set as a series of plotted points on a time-line graph.

2. The client application of claim 1 wherein the at least one filtering operation comprises a filter that selects a set of representative data points, of a grouped set of time-stamped time-series data values associated with a designated time period, according to a value-based selection criterion.

3. The client application of claim 2 wherein the value-based selection criterion includes designating for the filtered data set, from the grouped set, at least:

a data point having a largest value, and a data point having a smallest value.

4. The client application of claim 3 wherein the value-based selection criterion includes a first data point after an exception.

5. The client application of claim 3 wherein the value-based selection criterion includes designating for the filtered data set, from the grouped set, at least:

a first data point within the designated time period, and a last data point within the designated time period.

6. The client application of claim 5 wherein the value-based selection criterion includes a first data point after an exception.

7. The client application of claim 1 wherein the at least one filtering operation comprises a filter comprising:

a compression test sequence applied, upon receiving a next time-series data point, to at least the received next time-series data point, a held over data point and a last data point designated for plotting; and a time override that forces designating a candidate data point for plotting without regard to whether the candidate point would be stored as a result of applying the compression test sequence, upon receiving the next time-series data point.

8. The client application of claim 7 wherein the candidate data point is the held over data point.

9. The client application of claim 8 wherein the time override comprises an operation that determines an elapsed time between the last data point designated for plotting and the next time-series data point and designates the held over data point for plotting if the elapsed time exceeds a specified override time period.

10. The client application of claim 8 wherein the time override further comprises a real-time window timer that measures an elapsed period after the time stamp of the held over point and designates the held over data point for plotting in response to a specified period, measured by the real-time window timer, expiring.

11. The client application of claim 7 wherein the compression test sequence comprises a value deadband test that is applied to the held over data point and the last data point designated for plotting.

12. The client application of claim 7 wherein the compression test sequence comprises a rate deadband test that is applied to at least the last data point designated for plotting, the held over data point, and the next time-series data point.

13. The client application of claim 12 wherein the rate deadband test comprises determining a change in slope between a first line segment and a second line segment, wherein the first line segment includes at least the last data point designated for plotting, and the second line segment includes the next time-series data point and the held over data point.

14. The client application of claim 13 wherein the first line segment further comprises the held over data point.

15. The client application of claim 7 further comprising a quality change test wherein the held over data point is designated for plotting if a quality assigned to the held over data point differs from the quality assigned to the last data point designated for plotting.

16. The client application of claim 1 wherein the at least one filtering operation comprises an integer value filter including at least a deadband stage.

17. The client application of claim 16 wherein the at least one filtering operation comprises an integer value filter including at least a time period-based data point filtering stage.

18. The client application of claim 1 wherein the at least one filtering operation comprises an integer value filter including at least a time period-based data point filtering stage.

19. The client application of claim 1 wherein a set of filtering operations making up the time-series data filter is extensible.

20. A method for displaying, by a process control and manufacturing information database client application, received time-series data, the method comprising the steps, performed by the database client application, of:
 obtaining, via a client data acquisition interface, a set of timestamped time-series data values for an observed parameter from a process control and manufacturing information database;
 rendering from the set of timestamped time-series data values, by a time-series data filter including at least one filtering operation performed by the client application, a filtered data set for plotting on the graphical display interface; and
 rendering, by a display function of the client application, the filtered data set as a series of plotted points on a time-line graph.

21. The method of claim 20 wherein the rendering step comprises selecting, by a filter, a set of representative data points, of a grouped set of time-stamped time-series data values associated with a designated time period, according to a value-based selection criterion.

22. The method of claim 20 wherein the rendering step comprises performing, by a filter, the steps of
 applying a compression test sequence, upon receiving a next time-series data point, to at least the received next time-series data point, a held over data point and a last data point designated for plotting; and
 designating, based on a time override, a candidate data point for plotting, without regard to whether the candidate point would be stored as a result of the applying step, upon receiving the next time-series data point.

23. The method of claim 20 wherein the rendering step comprises applying, by an integer value filter, a deadband value test on an integer time-series data point.

24. The method of claim 23 wherein the rendering step comprises applying, by an integer value filter, a time period-based data point test on the integer time-series data point.

25. The method of claim 20 wherein the rendering step comprises applying, by an integer value filter, a time period-based data point test on an integer time-series data point.

26. A non-transitory computer readable medium including computer-executable instructions for displaying, by a process control and manufacturing information database client application, received time-series data, the computer-executable instructions facilitating performing, by the database client application, the steps of:
 obtaining, via a client data acquisition interface, a set of timestamped time-series data values for an observed parameter from a process control and manufacturing information database;
 rendering from the set of timestamped time-series data values, by a time-series data filter including at least one filtering operation performed by the client application, a filtered data set for plotting on the graphical display interface; and
 rendering, by a display function of the client application, the filtered data set as a series of plotted points on a time-line graph.

27. The non-transitory computer-readable medium of claim 26 wherein the rendering step comprises selecting, by a filter, a set of representative data points, of a grouped set of time-stamped time-series data values associated with a designated time period, according to a value-based selection criterion.

28. The non-transitory computer-readable medium of claim 26 wherein the rendering step comprises performing, by a filter, the steps of:
 applying a compression test sequence, upon receiving a next time-series data point, to at least the received next time-series data point, a held over data point and a last data point designated for plotting; and
 designating, based on a time override, a candidate data point for plotting, without regard to whether the candidate point would be stored as a result of the applying step, upon receiving the next time-series data point.

29. The non-transitory computer-readable medium of claim 26 wherein the rendering step comprises applying, by a discrete value filter:
 a deadband value test on a discrete time-series data point, and
 a time period-based data point test on the discrete time-series data point.

* * * * *